US012422909B2

(12) United States Patent
Magnussen et al.

(10) Patent No.: US 12,422,909 B2
(45) Date of Patent: Sep. 23, 2025

(54) SYSTEMS AND METHODS FOR CONFIGURING DEVICE FEATURES BASED ON DETECTED USE STATE

(71) Applicant: BANG & OLUFSEN A/S, Struer (DK)

(72) Inventors: Magnus Søgaard Magnussen, Taastrup (DK); Sven Ewan Shepstone, Struer (DK); Kevin Nørby Andersen, Copenhagen (DK)

(73) Assignee: Bang & Olufsen A/S, Struer (DK)

( * ) Notice: Subject to any disclaimer, the term of this patent is extended or adjusted under 35 U.S.C. 154(b) by 173 days.

(21) Appl. No.: 18/319,768

(22) Filed: May 18, 2023

(65) Prior Publication Data
US 2024/0385666 A1 Nov. 21, 2024

(51) Int. Cl.
G06F 1/26 (2006.01)
G06F 1/16 (2006.01)
H04R 1/10 (2006.01)

(52) U.S. Cl.
CPC .............. G06F 1/26 (2013.01); G06F 1/163 (2013.01); H04R 1/1041 (2013.01); *H04R 2460/03* (2013.01)

(58) Field of Classification Search
CPC ....... G06F 1/26; G06F 1/163; H04R 2460/03; H04R 1/1041
See application file for complete search history.

(56) References Cited

U.S. PATENT DOCUMENTS

| | | | |
|---|---|---|---|
| 8,270,658 B2* | 9/2012 | Goldberg | H04R 1/1041 381/384 |
| 9,344,792 B2 | 5/2016 | Rundle | |
| 9,628,893 B2* | 4/2017 | Stevens | H04R 1/1041 |
| 9,838,774 B2 | 12/2017 | Lee et al. | |
| 9,894,452 B1 | 2/2018 | Termeulen et al. | |
| 10,291,976 B2 | 5/2019 | Peterson et al. | |
| 10,491,981 B1* | 11/2019 | Wang | H04R 1/1041 |
| 10,547,931 B2 | 1/2020 | Villasenor et al. | |
| 2014/0064500 A1 | 3/2014 | Lee | |

(Continued)

FOREIGN PATENT DOCUMENTS

| | | |
|---|---|---|
| EP | 4175316 A1 | 5/2023 |
| KR | 102049781 B1 * | 11/2019 |

OTHER PUBLICATIONS

Machine translation of KR-10-2049781 B1 (Year: 2019).*
European Search Report, EP Appl. No. 24176709.4, issued on Oct. 14, 2024, 9 pages.

*Primary Examiner* — Glenn A. Auve
(74) *Attorney, Agent, or Firm* — Patterson + Sheridan, LLP

(57) ABSTRACT

A system for configuring one or more features of a wearable device based on a detected use state of the wearable device, the system including a wearable device including a first housing, a first earphone unit located within the first housing, and a plurality of sensors, wherein a first sensor of the plurality of sensors is a force sensor and a second sensor of the plurality of sensors is an inertial measurement unit (IMU) sensor, at least one processor and memory configured to process data from the plurality of sensors to detect a use state of the wearable device such that: if the detected use state is an active use state, the processor generates a signal to power on the wearable device, and if the detected use state is an inactive use state, the processor generates a signal to power down the wearable device.

20 Claims, 7 Drawing Sheets

(56) References Cited

U.S. PATENT DOCUMENTS

| | | | |
|---|---|---|---|
| 2014/0146976 A1* | 5/2014 | Rundle | H04R 1/1041 |
| | | | 381/71.6 |
| 2014/0254818 A1* | 9/2014 | Tse | H04R 1/1041 |
| | | | 381/74 |
| 2015/0358716 A1* | 12/2015 | Zhu | H04R 1/1041 |
| | | | 381/74 |
| 2016/0366507 A1* | 12/2016 | Hou | H04R 1/1041 |
| 2017/0251295 A1* | 8/2017 | Pergament | A61B 5/4809 |
| 2020/0186910 A1* | 6/2020 | Kemmerer | H04R 29/001 |
| 2021/0377680 A1* | 12/2021 | Lesso | H04R 3/00 |
| 2023/0017003 A1 | 1/2023 | Scheiermann et al. | |
| 2023/0030946 A1* | 2/2023 | Warren | H04R 1/1041 |
| 2024/0107246 A1* | 3/2024 | Saux | H04R 1/1091 |
| 2024/0187772 A1* | 6/2024 | Stankovic | H04R 1/1041 |

\* cited by examiner

SYSTEMS AND METHODS FOR CONFIGURING DEVICE FEATURES BASED ON DETECTED USE STATE

TECHNICAL FIELD

Embodiments of the present disclosure relate generally to systems and methods for detecting use state of electronic devices to automatically configure one or more features and more particularly to powering headphones based on force exerted on the headband.

BACKGROUND

Electronic device management is conventionally accomplished by a user manually controlling the power and features of the device through inputs such as buttons, dials, and touch surfaces or touch screens. This manual control of device features can be cumbersome and detract from the overall user experience when interacting with the electronic device. Conventionally, users are often required to adjust or otherwise control features before and after each use. This issue is particularly present with wireless headphones that require a series of manual user steps to configure the headphones before and after each active use.

Conventional approaches relating to automatically enabling or disabling features or power of electronic devices are limited.

Traditionally, focus on controlling active noise cancellation is enhanced, where to preserve battery life of a device, the active noise cancellation feature can be enabled or disabled based on whether an ear is detected via capacitive or proximity sensors in proximity to the device.

Another conventional approach includes use of capacitive proximity sensors to measure ear patterns of a user in relation to when devices are worn in or over the ear of the user, thereby automatically powering on or off devices based primarily on proximity sensor detection.

Yet another conventional approach relates to using audio headsets and circuitry for controlling operation of audio headsets in response to handling of the headset by the user, where whether a headset is on or off can be determined based on rotation of the headset in relation to the circuitry.

In another conventional approach, inductive sensing techniques may be utilized to determine and turn on or off a headset apparatus.

None of the conventional approaches of today make use of a plurality of modality detection by a plurality of types of sensors to determine use state of an electronic device and, based on the use state, power on, off, or down the electronic device and/or enable or disable selected features of the electronic device. Accordingly, needs remain to address these deficiencies.

SUMMARY

Various embodiments of the present disclosure aim to address the above problems.

In one aspect, the present disclosure provides a system for configuring one or more features of a wearable device based on a detected use state of the wearable device, wherein the system includes a wearable device, which includes a first housing, a first earphone unit located within the first housing, and a plurality of sensors, wherein a first sensor of the plurality of sensors is a force sensor and a second sensor of the plurality of sensors is an inertial measurement unit (IMU) sensor, at least one processor and memory configured to process data from the plurality of sensors to detect a use state of the wearable device such that: if the detected use state is an active use state, the processor generates a signal to power on the wearable device, and if the detected use state is an inactive use state, the processor generates a signal to power down the wearable device. In examples, powering down the wearable device can indicate that a signal is generated and transmitted by processor to put the wearable device in a low power or inactive mode. In examples, powering down the wearable device can also indicate that a signal is generated and transmitted by the processor to turn off the wearable device.

In another aspect, the present disclosure provides a method for configuring one or more features of a wearable device based on a detected use state of the wearable device, the method including: detecting, from one of a plurality of sensors coupled to the wearable device, at least one change in force acting on the wearable device; detecting, from another of a plurality of sensors coupled to the wearable device, at least one change in inertia related to the wearable device; processing, via a processor, the detected at least one change in force and the detected at least one change in inertia; determining, based on the processing, whether a detected use state is active or inactive, and: generating a signal to power on the wearable device if the detected use state is active; and generating a signal to power down the wearable device if the detected use state is inactive.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
FIG. 1 is a perspective view of headphones according to an embodiment.

While various embodiments are amenable to various modifications and alternative forms, specifics thereof have been shown by way of example in the drawings and will be described in detail. It should be understood, however, that the intention is not to limit the claims to the particular embodiments described. On the contrary, the intention is to cover all modifications, equivalents, and alternatives falling within the spirit and scope of the subject matter as defined by the claims.

DETAILED DESCRIPTION

Embodiments of the present disclosure are operable to detect a use state of electronic devices, such as wearable devices like headphones, and to automatically configure one or more features of the electronic device based on the detected use state. Configuring features can include controlling the power of the electronic device without relying on conventional means of manual user input (e.g., actuating a power button).

Referring to FIG. 1, a set of headphones 100 is depicted according to an embodiment. Headphones 100 comprise a headband 102 pivotally coupling earphone units 104 at opposing ends. Headband 102 can be adjustable such that the length of headband 102 between earphone units 104 can be shortened or lengthened. Headband 102 can optionally include a padded portion 106 to improve user comfort when worn.

Earphone units 104 each comprise earcups 108 and ear cushions 110. Earcups 108 house electrical components, such as speaker drivers, configured to produce sound towards ear cushions 110. An exterior surface of earcups 108 include one or more input 112 that can be used to receive user input. Input 112 can be one or more of buttons, sliders, touch sensitive surfaces, and the like. Input 112 can be configured to receive user input to control power, volume, sound proofing, and other features of headphones 100. Input 112 can be located anywhere on exterior headphones 100 such that input 112 remains accessible for manual user input when worn by a user. Earcups 108 can further include one or more input ports 114 configured to receive a cable connector and one or more indicator lights 116 configured to convey status information of headphones 100. The arrangement of input 112, input ports 114, and indicator lights 116 can vary between earcups 108.

Though headphones 100 of the embodiment of FIG. 1 (and other embodiments discussed herein) generally relate to or discuss headphones that are worn over the ears of a user, this disclosure and the various embodiments are not limited to over-ear headphones. Thus, aspects of the disclosure can also relate to in-ear earphones (often referred to as "ear buds"), earphones worn on the ears without completely covering the ears, one or more earphone units or components arranged within other devices that position the earphone(s) relative to one or more ears of a user (such as headsets, or wearables such as hats, glasses, or headbands), and other devices unless explicitly stated otherwise herein.

Figure 2A:
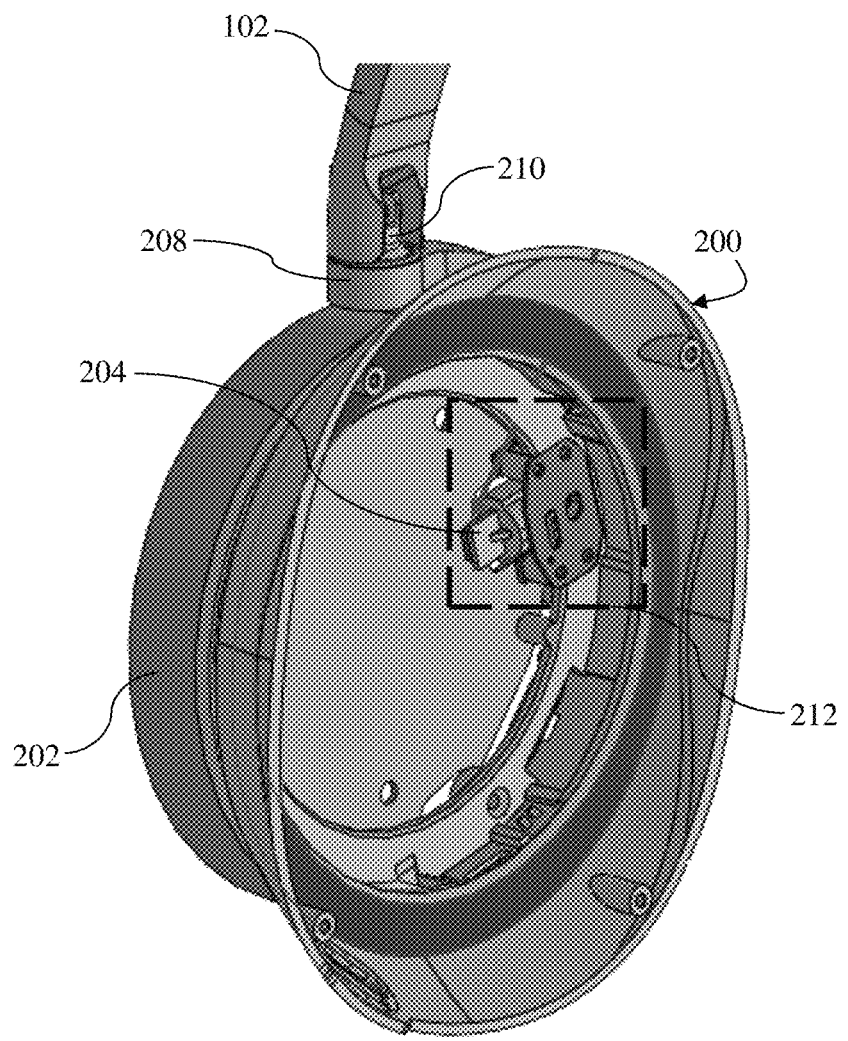
FIG. 2A is a perspective view of an earphone unit of headphones according to an embodiment.
Figure 2B:
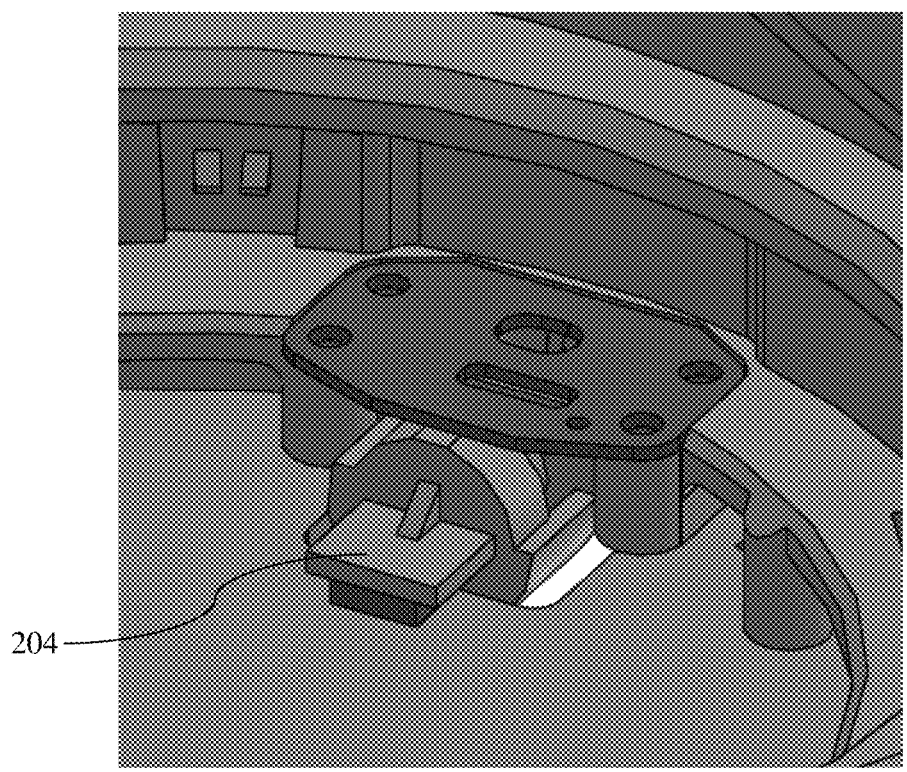
FIG. 2B is a partial perspective view of a force sensor of the earphone unit of FIG. 2A.

Referring to FIGS. 2A-2B, earphone unit 200 coupled to headband 102 is depicted according to an embodiment. FIG. 2B is a rotated close-up perspective view of region 212 of earphone unit 200. Earphone unit 200 includes housing 202 configured to contain a speaker driver (not shown), force sensor 204, and processing hardware (not shown). Earphone unit 200 is pivotally and/or rotatably coupled to headband 102 via coupling mechanism 208 including hinge 210. Housing 202 may be fixedly or removably coupled to headband 102.

In embodiments, at least one sensor, such as a force sensor 204, is configured to detect a characteristic related to headphones 100, such as a force exerted on earphone unit 200 by headband 102 in the case of force sensor 204. For example, when placed on a user's head, headband 102 is biased outwards such that an inwards force is exerted on earphone unit 200. Force sensor 204 is communicatively coupled to the processing hardware that can comprise at least one processor and a memory. In embodiments, data collected by force sensor 204 can be communicated to a server or user device communicatively coupled to and remote from earphone unit 200, or located within headphones 100, or both. In some embodiments, another sensor modality can be used in addition to or instead of a force sensor, such as an inertial measurement unit (IMU) sensor to sense orientation of motion, a proximity sensor to sense proximity, a capacitive touch sensor to tense touch, a millimeter (MM) wave sensor to sense reflected signals that indicate angle, range, and velocity of sensed objects, an infrared sensor to sense heat radiation, a temperature sensor to sense temperature, a humidity sensor to sense humidity, or other sensors known to those of skill in the art.

Figure 3:
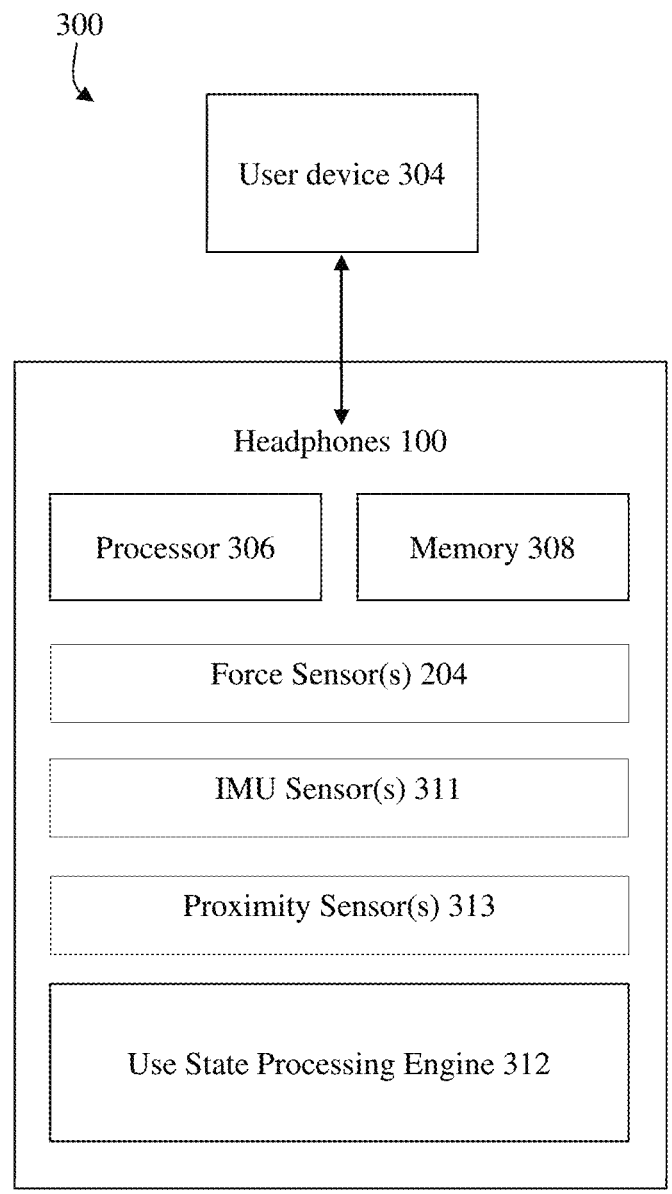
FIG. 3 is a block diagram of a system for configuring one or more features of headphones based on detected use states according to an embodiment.

Referring to FIG. 3, a block diagram of a system 300 for detecting a use state of headphones 100 is depicted according to an embodiment. System 300 comprises headphones 100 and user device 304. System 300 can be used to determine a use state of headphones 100 (e.g., worn for active use vs. not worn) that can be used to configure one or more features or operations of headphones 100.

In embodiments, headphones 100 can be any electronic device that incorporates one or more earphone units functionally equivalent to earphone unit 200. In alternate embodiments, headphones 100 can comprise any electronic device functionally equivalent to earphone unit 200, including at least in-ear earbuds. Headphones 100 generally comprise processor 306, memory 308, one or more force sensors 204, one or more IMU sensors 311, one or more proximity sensors 313, and one or more engines, such as use state processing engine 312. In some embodiments, use state processing engine 312 is part of processor 306.

Processor 306 can be any programmable device that accepts digital data as input, is configured to process the input according to instructions or algorithms and provides results as outputs. In an embodiment, processor 306 can be a central processing unit (CPU) or a microcontroller or microprocessor configured to carry out the instructions of a computer program. Processor 306 is therefore configured to perform at least basic arithmetical, logical, and input/output operations.

Memory 308 can comprise volatile or non-volatile memory as required by the coupled processor 306 to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory (ROM), flash memory, ferroelectric RAM, hard disk, or optical disc storage, for example. The foregoing lists in no way limit the type of memory that can be used, as these embodiments are given only by way of example and are not intended to limit the scope of the present disclosure.

In examples, force sensor 204 can be configured to remain awake in order to be able to detect force effected unto it. If force is detected by force sensor 204, it can be configured to trigger awake at least one IMU sensor 311 such that the IMU sensor 311 can be used to detect specific force, rate, and orientation of the force detected by force sensor 204. If the IMU sensor 311 senses that the force detected is located to headband 102, wherein the headband 102 extends sufficiently in comparison to a threshold value, then the IMU sensor 311 can further awaken other corresponding sensors, such as proximity sensors 313. In an example, force sensor 204 can be configured to remain continuously active, even when headphones 100 are powered down. Advantageously, force sensor 204 uses very little power, especially in comparison to IMU sensors 311 and proximity sensors 313, and therefore such a configuration can enable optimal use for the user without posing a substantial drain on battery life of the headphones 100. In alternate examples, force sensor 204 can be configured to power down alongside the headphones 100, or other sensors can be configured to remain on (such as IMU sensor 311, proximity sensor 313, etc.). Therefore, force sensor 204 can be configured to remain active without draining battery of headphones 100, and can be used to detect any user handling of headphones 100 and subsequently wake the overall system for further detection and assessment of the detected force (e.g., activity). Data detected by force sensor 204 can be saved and conveyed to use state processing engine 312.

System 300 can be implemented irrespective of the number or type of engines. In embodiments, use state processing engine 312 can be within or outside a housing of headphones 100. In alternate embodiments, use state processing engine 312 can be within or outside a housing for any electronic device. In an embodiment, use state processing engine 312 can operate on a server remote from headphones 100 and user device 304. In alternate embodiments, use state processing engine 312 can operate on a server remote from any electronic device with functional earphone unit 200 and user device 304. In another embodiment, use state processing engine 312 can operate on user device 304.

Proximity sensors 313 and IMU sensors 311, which can be located throughout the headphones 100, are used to detect quantities which can contribute to more confidence in the use state determination process, such as orientation of force, rate of force, type of force, surface feel of force (e.g., whether human skin is detected), etc. For example, when force sensor 204 has detected a change in force, it can be configured to transmit a signal to awaken IMU sensor 311 and proximity sensor 313, whereupon IMU sensor 311 can be configured to detect the orientation of force with respect to headphones 100 (for example, whether the detected change in force is from an extension of headband 102 or a retraction of headband 102, etc.) and proximity sensor can be configured to detect proximity of headphones 100 to the user (for example, whether human skin is detected against ear cushion 110, etc.).

Table 1 below provides an embodiment of typical load and sensor values which can trigger communication between force sensor and circuitry.

TABLE 1

| Load and Sensor Values | | |
|---|---|---|
| Load | | Sensor 1 |
| 4N Clamp | SNR | 49 |
|  | LSB | −418 |
| 80 mm Pull | SNR | 68 |
|  | LSB | −3894 |

Force sensor 204, which is configured to detect changes in force, can sense extensions of headband 102. The above table 1 indicates that as headband 102 is extended out, load output from sensor (LSB) value increases. LSB output fluctuations are visible due to the sensitivity of force sensor 204. As an example, force sensor 204 can detect headband 102 extension or detraction as a user chews or speaks, and such slight force changes can be observed in slight fluctuations of LSB output. Larger force changes, such as a user taking off headphones 100, results in significant fluctuations of LSB output. Signal to noise ratio (SNR) indicates the efficiency of each of the plurality of sensors, measures as the ratio of amplitude of the desired signal to the amplitude of the noise signals at a given point in time. The higher the SNR value, the more sensitive the force sensor 204 is to perceiving changes in LSB.

In embodiments, headphones 100 include use state processing engine 312 configured to control one or more features of headphones 100 based on data conveyed by forced sensor 204. The use of the term "engine" herein refers to any hardware or software that is constructed, programmed, configured, or otherwise adapted to autonomously carry out a function or set of functions, such as detecting user device 304. Engine is herein defined as a real-world device, component, or arrangement of components implemented using hardware, such as by an application specific integrated circuit (ASIC) or field programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations and should generally not be limited to any particular implementation exemplified herein, unless such limitations are expressly called out.

In embodiments, each engine can itself be composed of more than one sub-engine, each of which can be regarded as an engine in its own right. Moreover, in the embodiments described herein, use state processing engine 312 corresponds to defined autonomous functionality, wherein use state can be determined without need for additional manual input from the user; however, it should be understood that in other contemplated embodiments, functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Use state processing engine 312 can automatically configure one or more features of headphones 100 based at least in part on received sensor data. By processing the force and orientation of force applied to the earcup 108 from the headband 102 alongside and type of detected capacitance or proximity, use state processing engine 312 can determine if headphones 100 are on a user's head, and therefore may represent an active use instance. In alternate embodiments, use state processing engine 312 can process detected sensor data from force sensor 204, IMU sensor 311, and proximity sensor 313 to determine whether in-ear earbuds are in a user's ears, and therefore in an active use state.

In particular, the inventors of the present disclosure have discovered that the relative increase in force when the headband is extended (e.g., worn around a user's head) can be implemented within use state processing engine 312 to recognize an active use state or an inactive use state and to control features of headphones 100 accordingly. Active use states can include any situation in which a user would likely desire the headphones to produce sound or provide noise cancelling functionality. Inactive use states can include one or more of the headphones being placed on a flat surface, folded, stowed in a container, worn around the neck, placed on a headphone stand, or held by a user, among others.

In alternate embodiments, use state processing engine 312 can recognize the difference in force exerted on an exterior surface of electronic device comprising earphone unit 200 (such as, for example, in-ear earbuds) to determine whether a use state is active or inactive. As indicated above, active use states can include any situation in which a user would likely desire the electronic device to produce sound or provide noise cancelling functionality. Inactive use states can include one or more of the electronic device being placed on a flat surface, folded, stowed in a container, placed on a stand, or held by a user, among others.

In some embodiments, the features controlled based on received force data can be selected via a user interface of user device 304. User device 304 generally comprises processing and memory capabilities and can establish a wireless or wired connection with a network or otherwise communicate to headphones 100, such as by Bluetooth. Examples of user device 304 include smartphones, tablets, laptop computers, wearable devices such as smart watches or fitness tracking devices, other consumer electronic devices or user equipment (UE), and the like. The term "user device" will be used herein throughout for convenience but is not limiting with respect to the actual features, characteristics, or composition of the or any device that could embody user device 304. Headphones 100 are configured to provide two-way data communication with user device 304 via a wired or wireless connection. In alternate embodiments, electronic devices with earphone unit 200 are configured to provide two-way data communication with user device 304 via a wired or wireless connection.

In embodiments, user device 304 can run an instance of the user interface designed to facilitate user interaction with one or more features of headphones 100 or any electronic device comprising earphone unit 200. In some embodiments, the user interface can comprise a mobile application, web-based application, or any other executable application framework.

The user interface can be configured to receive user inputs and provide outputs regarding configuration and status of headphones 100, or, alternately, any electronic device featuring earphone unit 200. The user interface can allow for personalized system control and calibration, such as enabling a user to calibrate one or more active use states by placing headphones in a desired position and recording sample force data. In embodiments, user device 304 can be associated with one or more user profiles that can each represent distinct feature handling requirements based on detected use state of headphones 100 or use state of any electronic device comprising earphone unit 200.

Embodiments of the present disclosure can optionally implement artificial intelligence (AI) or machine learning (ML) to better recognize change in force associated with putting on and taking off headphones 100 or any electronic device comprising functional equivalent of earphone unit 200. Patterns in detected force on headphones 100 or any electronic device comprising functional equivalent of earphone unit 200 when changing use states can be extracted manually or automatically by machine learning approaches such as, for example, convolutional neural networks, to produce training data that can be compared to received data during use. Accordingly, the ML model can be efficiently applied to labelled (supervised) force data (data representing known use state transitions) by use state processing engine 312. In embodiments, unlabeled (unsupervised) force data can be used although accuracy and precision of the ML model will perform comparatively worse without additional training.

With sufficient training, the ML model can better recognize when differences in detected force may belong to use state transitions. In embodiments, the comparison process can be accomplished by computing similarity metrics using correlation or machine learning regression algorithms. For example, if the similarity of a "take off headphones" gesture is above a certain threshold, (e.g., 75%, 90%, 95% or 99% similarity) the matching process can determine that the received force data indicates a change of use state and features of the headphones 100 can be controlled accordingly, such as powering down the headphones 100. This analysis can be improved during operation by inclusion of feedback loops directed to classifying force patterns for particular users. Alternate embodiments can include analyzing gestures pertaining to electronic devices including functional equivalents of earphone unit 200, such as for example an in-ear earbud, where a "take off earbuds" gesture is above a certain threshold (as discussed earlier in the example regarding headphones 100). As more comparisons between received data and training data are made, feedback of the accuracy of previous comparisons can be tracked to better recognize future force data patterns.

In embodiments, use state processing engine 312 can implement one or more classifiers to consider parameters such as type of electronic device (including type of headphones 100) and type of force sensor 204, IMU sensor 311, and proximity sensor 313.

In operation, force applied to exterior of earcups 108 by a headband 102 can automatically trigger a signal to power on IMU sensor 311 and proximity sensor 313. The force sensor 204, which can be configured to be located inside an earcup 108 of headphones 100 or an earbud, can work alongside IMU sensor 311 and proximity sensor 313 to detect the change in force from the headband to the earcup 108, wherein detected force can be both positive (e.g., expanding the headband 102/moving the earcups 108 away from each other) and negative (moving the earcups 108 closer together) direction. This detected change in force can automatically trigger electronic device such as headphones 100 to automatically power on and can also automatically trigger control of features based on an active use state. Features that can be controlled include one or more of establishing or disconnecting a Bluetooth connection of electronic device such as headphones 100 with user device 304, enabling or disabling of user input mechanisms of electronic device such as headphones 100 (such as a touch-based user interface), resuming or pausing media playback, changing playback volume, and changing between active noise cancellation level mode and transparency mode.

In embodiments, AI or ML systems may be included in or communicatively coupled to use state processing engine 312, to further enable the headphones or user device to respond with one or more settings or features based on the received data from sensors, including sensors 204, 311 and 313 in combination with data received from one or more other sources, including the user device 304 or other sources. This data could include location data, calendar data, proprioceptive data, health and wellness data, or other relevant user data. For example, one or more profiles could be created in response to the AI system's data processing to reflect a user's typical behavior, activities, or preferred settings.

Embodiments of the present disclosure accordingly provide for robust use state detection of electronic device such as headphones or in-ear earbuds. One aspect of the present disclosure is to provide solutions to power on and down for headphones, in-ear earbuds, and any similar electronic devices that is sufficiently reliable as to not require conventional means of power actuation, such as a power button, on the electronic devices. With the described system the power of electronic devices can automatically turn on when the electronic devices are put on by a user and power down when the electronic devices are removed, improving the efficiency of battery usage while simultaneously simplifying the user experience. Additionally, use state detection as described herein supports a wireless integration and does not require any additional electronics or complexity within the electronic device.

Although described with general respect to headphones, it should be appreciated that embodiments of the present disclosure can pertain to any electronic devices operable to configure parameters based on detected use state. For example, ear buds incorporating one or more sensors configured to detect use state, such as by detecting force on particular portions of, e.g., the ear tips, can be configured to detect use states in a similar manner as headphones 100.

Figure 4:
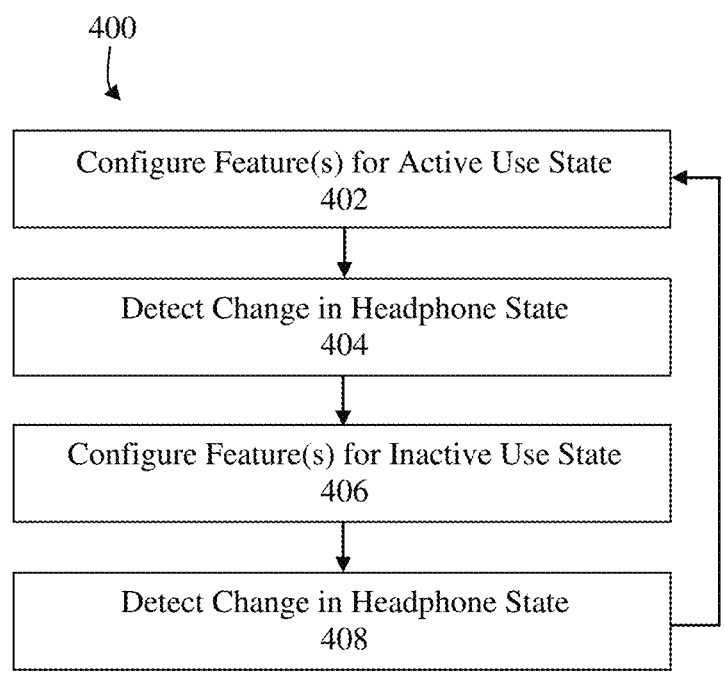
FIG. 4 is a flowchart of a method for configuring one or more features of headphones based on detected use states according to an embodiment.

Referring to FIG. 4, a flow chart of a method 400 for automatically controlling one or more features of electronic devices such as headphones is depicted according to an embodiment. In embodiments, headphones 100 or any electronic devices with earphone units 200 can implement method 400.

At 402 one or more features of electronic devices such as headphones 100 can be set according to an active use state. During the active use state, the electronic devices such as headphones 100 can be powered on and selected features can be enabled. For example, a Bluetooth connection with a user device 304 can be established.

At 404, the force sensor 204 will immediately detect the rapid decline of force as the user lowers or takes off the electronic devices such as headphones 100. Correspondingly, the IMU sensor can be configured to detect the orientation of the motion of force (i.e., detect "lowering" of electronic devices such as headphones 100). In addition, proximity sensors can be configured to detect that electronic devices such as headphones 100 are not proximal to human skin for at least a preset threshold period (e.g., 5 seconds), or, on the ear of the user (e.g., "OnEar" state, discussed later with respect to FIG. 4). In total, different sensors will transmit the different detected sensor modalities to processor 306, where processor will process each received signal and determine, based on the overall processing of every received signal, that electronic devices such as headphones 100 are no longer on the user's head, ear, person, or proximity, and can be set to an inactive state.

At 406, electronic devices such as headphones can automatically disable selected features in accordance with an inactive use state, including disablement of certain features to conserve battery charge and to provide a better user experience, such as Bluetooth audio, Touch UI, and pausing playback. When in an inactive state, electronic devices such as headphones can be automatically powered down.

At 408 a force sensor of electronic devices such as headphones detects a force pattern indicative of a user putting on or wearing electronic devices such as headphones, such as a brief, sharp increase in force followed by an overall increase in force than that experienced during the inactive use state. In embodiments, the force detected can be required to surpass a certain threshold force before an active use state is set. The electronic devices such as headphones can automatically enter an active use state when a force sensor of the electronic devices such as headphones detects a sufficient force for a predetermined time period (e.g., 5 seconds). An active use state can also be recognized during instances when the processor detects, via one or more associate proximity sensor(s), an "OnEar" state.

The method may then repeat by returning to 402 and configuring electronic devices such as headphone features for an active use state.

Inactive use states can include a variety of substates that each represent a particular type of nonuse. In one example, differing sensors can transmit differing sensor modalities to processor 306 to process as signals, based on the overall signal processing of each received sensor modality, detect whether force, motion, proximity, and orientation of electronic devices such as headphones 100 with regard to the user indicates that the electronic devices such as headphones 100 are in "laying on a surface" substate before being automatically powered down. For example, such a substate could be determined if the force sensor is unable to detect sufficient force for a particular time period, and proximity sensor(s) are unable to detect human touch. In a situation where proximity sensors do detect human touch but sufficient force is not detected, the electronic devices such as headphones can enter a "held" substate. In such a substate that may indicate a user is about to use the electronic devices such as headphones certain features can be selectively activated or be prepped such that an active use state can be entered more quickly. For example, a Bluetooth connection with a user device 304 can be maintained but playback can be paused. Other inactive use substates can include one or more of "folded," "stowed," "around the neck," "on a stand," and "on a headphone stand."

Figure 5A:
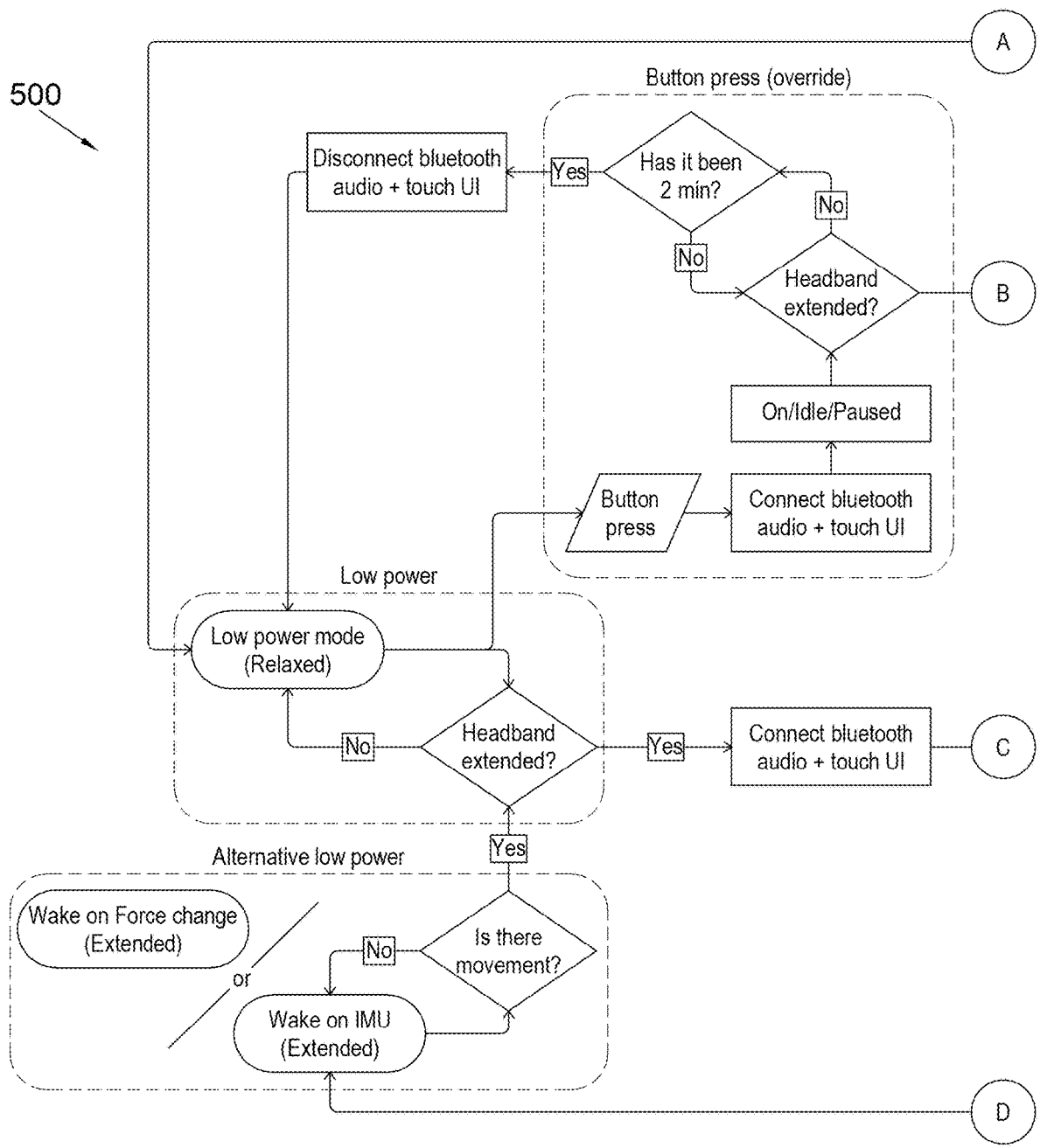
FIG. 5A-5B is a flowchart of a method for detecting use states according to an embodiment.
Figure 5B:
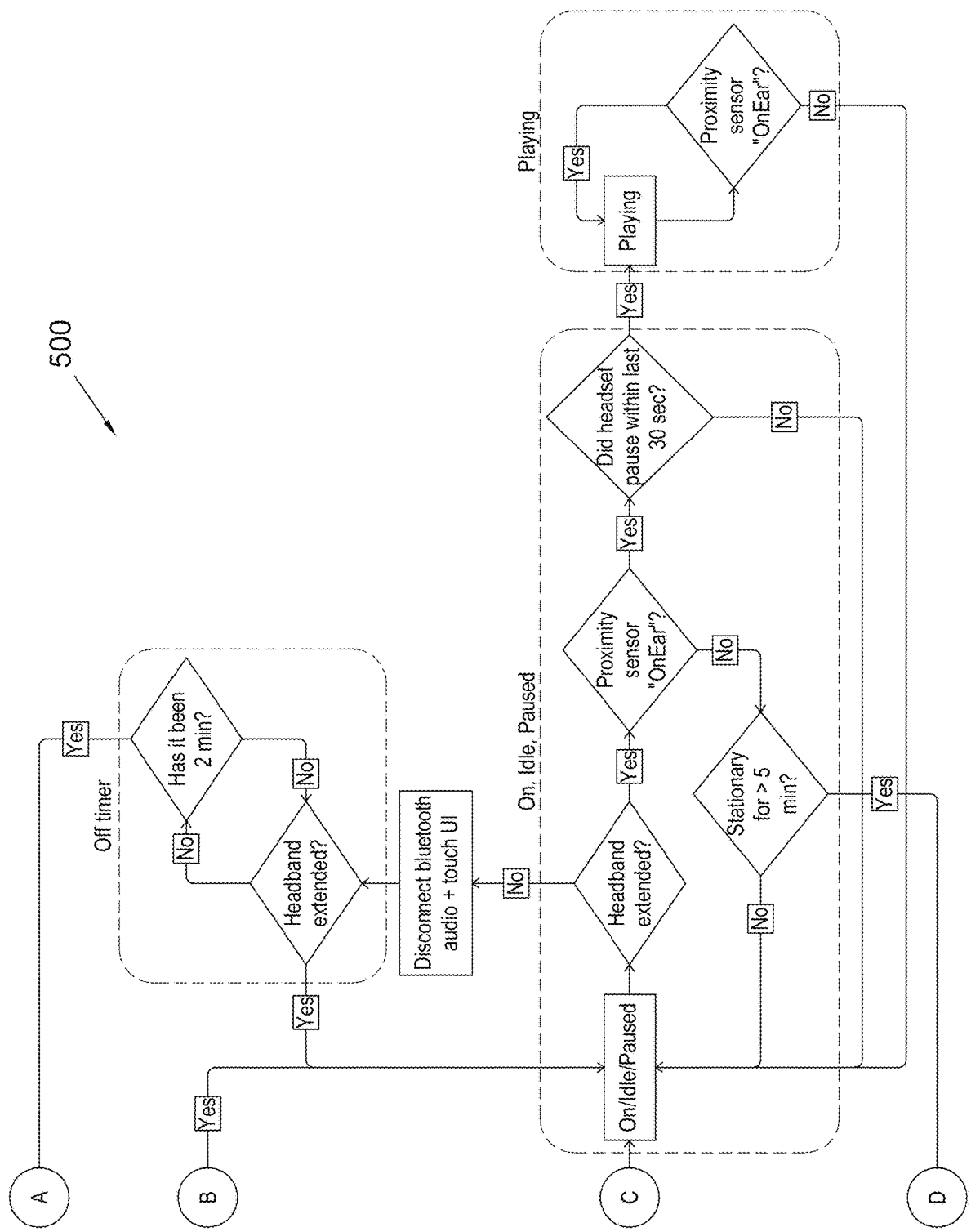

Referring to FIGS. 5A-5B, is a flowchart of a method for detecting use states according to an embodiment. FIG. 5A and FIG. 5B each denote embodiments for detecting use states such as various configurations for active use states and inactive use states.

Even if stowing away electronic devices, such as for example collapsing headphones 100, triggers force sensor 204 to detect some slight force exerted against it, the motion of the predetermined configured collapsibility of electronic devices such as headphones 100 may trigger IMU sensor(s) to generate an automated signal for electronic devices such as headphones 100 to power down. Similarly, even if IMU sensor(s) detect motion as electronic devices such as headphones 100 is contained in a moving bag, such motion may trigger an automated powering down of electronic devices such as headphones 100.

There may be several configurations for when electronic devices such as headphones 100 are in the inactive state. For example, if headphones 100 is "around the neck," where headband 102 is around the neck of the human user, because force sensor 204 may not directly be detecting any force and/or because proximity sensor(s) may not detect human touch, headphones 100 may automatically power down. Proximity sensors may be highly advanced, such that they may be able to distinguish between human touch and other materials. In another example, electronic devices such as headphones 100 are configured to be placed on a device stand, placed on a device stand in a flexed state, and resting on a computer display, electronic devices such as headphones 100 may automatically power down, triggered by lack of detected motion via IMU sensor(s), lack of detected human touch via proximity sensor(s). Force would be applied from the flexed state of the device stand, but due to lack of motion and no ears in proximity of proximity sensors, the electronic devices such as headphones 100 would turn off but trigger on the IMU sensors, to understand whether detected force changed orientation or any other quantifiable quality to indicate that electronic devices such as headphones 100 are back in use and should be awakened. Even if the human user is walking while gripping headband 102, IMU sensor(s) may not detect motion because IMU sensor(s) may not be configured to detect slight motion. An instance where the human user is gripping headband 102 and is in motion by walking may constitute such negligible motion. Any motion that may be detected via IMU sensor(s) may be related to motion directly corresponding to detected force on a surface of housing 202. Though human touch may be present against an inactive surface as the human user grips headband 102, human touch may be detected via proximity sensor(s) located on active surfaces, such as, for example, housing 202. Therefore, IMU sensor(s) may not detect motion, proximity sensor(s) may not detect any human touch, and force sensor may not detect force, and thereby it may automatically trigger a signal that the use state is inactive.

In another example, when the human user positions electronic devices such as headphones 100 on the head or in the ear such that housing 202 will be directly on or in the human user's ear, force sensor 204 may detect force exerted on it via pressure exerted on housing 202, IMU sensor(s) may detect motion, and proximity sensor(s) may detect human touch on the active surface of housing 202 or via pressure exerted on housing 202; thereby it may be automatically triggering the determination of active use state. Active use state may automatically trigger processor in the circuitry to automatically signal to power on headphones 100 and enable selected related features, such as Bluetooth Audio and, if electronic devices such as headphones 100 or in-ear earbuds are firmly affixed to the human user's head or ear, Touch UI.

Electronic devices such as headphones 100 and their selected features may be in a low power mode setting (relaxed) or not fully on. Force sensor 204 may not detect any outward force or that headband 102 is extended, such that electronic devices such as headphones 100 may stay in low power mode setting. Alternatively, force sensor 204 may detect a force exerted on it, such as, for example, detecting extension of headband 102 or change in exerted force upon a tip of an earbud associated with an in-ear earbud, such that it automatically triggers an active use state signal where it may automatically enable selected features and power on the electronic devices. Electronic devices, such as headphones 100, may automatically enable selected features, such as, for example, Bluetooth Audio and Touch UI.

In certain configurations, an override option may be available, which may allow the human user to manually actuate input 112 or connect to cable connector input port 114, such that if any actuator is activated via manual user input, electronic devices such as headphones 100 automatically determines whether an inactive use state is reached and subsequently disables and disconnects. Electronic devices such as headphones 100 may automatically trigger electronic devices such as headphones 100 into "on/idle/paused" mode, where it may enable selected features such as Pause Playback. Electronic devices such as headphones 100 may use force sensor 204 to detect whether headband 102 is extended or whether force is exerted upon tip of an earbud such that force sensor 204 detects an upward force against an inactive surface of an electronic device. If it is determined that headband 102 is extended or that a tip of an earbud is pressed against or that force is otherwise exerted, electronic devices such as headphones 100 may be set to "on/idle/paused" mode where selected features are enabled. Proximity sensors may be used to determine whether human touch is detected against an active surface, whereupon if proximity sensors detect human touch within a predetermined threshold period (e.g., 5 minutes), the "OnEar" state is activated which corresponds to positive use state. Alternately, if it is not determined that headband 102 is extended or that a tip of an earbud is pressed against or that force is otherwise exerted, force sensor 204 may monitor, for at least a predetermined period (e.g., 2 minutes), whether any change in extension or retraction of ear tip or headband 102 or any other active or inactive surface is detected. In certain configurations, if at least a threshold period has passed since headband 102 was last extended or since an ear tip was pressed against, then electronic devices such as headphones 100 may disable selected features. Electronic devices such as headphones 100 may disable selected features, such as Bluetooth Audio and Touch UI, and may revert to "low power mode." Alternately, if a threshold period has not yet passed, force sensor 204 may continue to monitor for any changes as to whether headband 102 exerts a force or if any pressing force is felt.

In certain configurations, force sensor 204 may have generally already detected some amount of force. Electronic devices such as headphones 100 may fully enable all selected features in such configurations. If force sensor 204 detects any force exerted against it, such as for example if force sensor 204 detects that headband 102 is extended or if force sensor 204 detects force pressing against tip of an earbud of an associated in-ear earbud, it may use its proximity sensors to determine if it detects human touch on an active surface. Force sensor 204 may use proximity sensor(s) to detect any human touch against an active surface such as housing 202, as human touch may be indicative of whether electronic devices such as headphones 100 is placed on the head of the human user or may detect whether housing 202 is touching a human ear. Alternatively, if force sensor 204 does not detect any force exerted against it, such as, for example, force sensor 204 does not detect that headband 102 is extended or force sensor 204 does not detect ear tip is pressed against, then it may determine an inactive use state and automatically signal to disable selected features, such as, for example, Bluetooth Audio and Touch UI. After disabling selected features, electronic devices such as headphones 100 may use force sensor 204 to detect whether, for a predetermined threshold of time, headband 102 is extended or if an ear tip of an earbud of an in-ear earbuds is pressed upon, where, if force sensor 204 does not detect extension of headband 102 or pressing of ear tip within the predetermined threshold of time, it may trigger the electronic devices into low power mode or relaxed mode.

Electronic devices such as headphones 100 may be in "off timer" mode, where force sensor 204 may be used to determine whether headband 102 is extended within the predetermined threshold of time or whether ear tip is pressed against. Force sensor 204 may be used to discern whether, within the predetermined threshold of time, headband 102 extends or does not extend or ear tip is pressed upon. If, within the predetermined threshold of time, headband 102 is extended or ear tip is pressed upon, electronic devices such as headphones 100 may be set to "on/idle/paused" mode. If, after the predetermined threshold of time, headband 102 is not extended or an ear tip is not pressed upon, electronic devices such as headphones 100 may be booted to low power mode.

Proximity sensor(s) may be used to determine whether human touch is detected on any active surface. If human touch is detected, then the processor may determine whether electronic devices such as headphones 100 was set to "on/idle/paused" within the threshold period of time (e.g., 1 minute). If human touch is not detected, then force sensor 204 must detect whether, for the next predetermined passage of time, electronic devices such as headphones 100 is stationary, meaning no force is detected via force sensor 204. If, within the passage of time, force sensor 204 detects force, then it may set electronic devices such as headphones 100 to "on/idle/paused" mode. If the passage of time occurs without force sensor 204 detecting any force, electronic devices such as headphones 100 may be set to alternative low power mode where it may be wakened by motion sensors detecting motion. The passage of time may be at least five minutes.

Processor 306 may determine whether electronic devices such as headphones 100 was set to "on/idle/paused" mode within a threshold amount of time (e.g., within the last thirty seconds). If processor 306 determines that electronic devices such as headphones 100 was set to "on/idle/paused" mode within the threshold amount of time, then the mode is shifted to "play." If processor 306 determines that electronic devices such as headphones 100 was set to "on/idle/paused" mode for a period over the threshold amount of time, (e.g., more than thirty seconds), then electronic devices such as headphones 100 may continue in "on/idle/paused" mode. Electronic devices such as headphones 100 is set to "play" for as long as proximity sensors detect human touch against an active surface such that the "OnEar" state is on, indicating the use state is active. Electronic devices such as headphones 100 may be set to "play," and use state may be active, and all selected features may be enabled. Force sensor 204 triggers the IMU sensors to awaken, whereupon, if the IMU sensor detects that sufficient change in force is detected, it may trigger on the rest of the system, including proximity sensors which may be used to determine whether human touch is detected, where as long as human touch is detected, proximity sensor(s) may signal that headphones 100 is "OnEar", and electronic devices such as headphones 100 state is set to "play." If it is determined that proximity sensor(s) cannot signal for the "OnEar" status because human touch is not detected, then electronic devices such as headphones 100 may revert to "on/idle/paused" mode.

If proximity sensor(s) do not detect human touch to trigger an "OnEar" status, force sensor 204 may be used to detect whether electronic devices such as headphones 100 is stationary for more than threshold of time, (e.g., 5+ minutes). If it is determined that electronic devices such as headphones 100 is stationary for longer than the threshold period, then electronic devices such as headphones 100 may be placed in "alternative low power mode." However, if it is determined that electronic devices such as headphones 100 is stationary for less than the threshold period, then electronic devices such as headphones 100 is set to "on/idle/paused" mode.

Electronic devices such as headphones 100 may be in "alternative low power mode" where electronic devices such as headphones 100 may be awakened from alternative low power mode if IMU sensor(s) detect any motion. IMU sensor(s) may be used to determine whether any motion is detected. If motion is detected, force sensor 204 may be used to determine whether headband 102 is extended (or, by example, if an ear tip of an earbud of an associated in-ear earbuds is pressed upon).

Housing 202 can include one or both of active surfaces and inactive surfaces.

Accordingly, the present disclosure is operable for use with active surfaces or device housings. As used herein, the term "active" is defined as a surface configured to detect human touch and the term "inactive" is defined as a surface that is not capacitive, pressure sensitive, or otherwise arranged to detect touch through delivery of a signal.

Active surfaces, which provide enhanced sensitivity and immediacy to solutions, can enable force sensor 204 to diligently detect even seemingly small forces. Force sensor is configured to also detect force exerted on inactive surfaces, such as for example, detecting force outwardly exerted on headband 102 as headband 102 extends or retracts, which can originate from the user as he places headphones 100 on his head or for example detecting force outwardly exerted on an ear tip of an earbud associated with an in-ear earpiece which can originate from the user as he places earbuds in his ears. Inactive surfaces, which provide an avenue for cutting costs, would enable force sensor 204 to make use of practical resources.

Active surfaces, which may be configured to be especially sensitive to certain types of materials, may be a part of electronic devices such as headphones 100. Specifically, housing 202 may have at least one active surface where the active surface is configured on the housing 202 to be situated such that, when the user places headphones 100 atop his head, active surface of housing 202 directly touches the ear of the user. Such a configuration enhances ability of headphones 100 to collect more information regarding the use state of headphones 100, as such placement of the active surface enables the active surface to detect what material it presses against using a series of capacitive touch sensors. In other words, the capacitive touch sensors of the active surface may be configured to detect human skin, such that if the user is wearing headphones 100, the active surface of housing 202 may be pressed against the ear of the user whereupon the capacitive touch sensors may automatically detect human skin and signal the collected data to the processor. The processor may use this collected data, in combination with data from the force sensor 204 regarding whether headband 102 is extended or not extended, to determine the use state of headphones 100. If human skin is detected by the active surface and if the force sensor detects force from extension of headband 102, the processor 306 may automatically determine an active use state and may automatically power on headphones 100 and may enable selected features. If either human skin is not detected by the active surface, or if force sensor 204 does not detect relevant force, then the processor 306 may automatically determine an inactive use state and may automatically power down headphones 100 and may disable selected features.

Inactive surfaces, which may be anywhere on electronic devices such as headphones 100 where there is not an active surface, may be configured such that they will not detract from the sensitivity of active surfaces and not hinder ability of the active surface to collect pertinent information. For example, inactive surfaces may be anywhere on headband 102, as because human users often have hair or wear hats, headband 102 may not be directly pressing against human skin, and therefore detecting human skin on headband 102 may not be as insightful to determining use state of headphones 100.

The following clauses are part of the present disclosure:

In clause 1, the present disclosure provides system for configuring one or more features of a wearable device based on a detected use state of the wearable device, the system comprising: a wearable device comprising: a first housing, a first earphone unit located within the first housing, and a plurality of sensors, wherein a first sensor of the plurality of sensors is a force sensor and a second sensor of the plurality of sensors is an inertial measurement unit (IMU) sensor, at least one processor and memory configured to process data from the plurality of sensors to detect a use state of the wearable device such that: if the detected use state is an active use state, the processor generates a signal to power on the wearable device, and if the detected use state is an inactive use state, the processor generates a signal to power down the wearable device.

In clause 2, where the present disclosure provides the system of clause 1, wherein the active use state indicates that a user desires operation of the wearable device, and wherein the inactive use state indicates that a user does not desire operation of the wearable device.

In clause 3, where the present disclosure provides the system of clause 1, wherein the wearable device is a set of headphones comprising a headband having a first end coupled to the first housing and a second end.

In clause 4, where the present disclosure provides the system of clause 3, wherein the headband is extendable and retractable, and wherein extension or retraction of the headband results in a change in force that can be detected by the force sensor.

In clause 5, where the present disclosure provides the system of clause 4, wherein as the force sensor detects a change in force due to extension of the headband, the load sensor output value increases.

In clause 6, where the present disclosure provides the system of clause 3, wherein a second earphone unit is located within a second housing coupled to the second end.

In clause 7, where the present disclosure provides the system of clause 1, wherein the wearable device is an in-ear earphone.

In clause 8, where the present disclosure provides the system of clause 1, wherein the plurality of sensors can further comprise at least one of a proximity sensor, a skin detection sensor, a millimeter (MM) wave sensor, an infrared (IR) sensor, a temperature sensor, a capacitive sensor, or a humidity sensor.

In clause 9, where the present disclosure provides the system of clause 1, wherein if the detected use state is an active use state, the processor generates a signal to enable at least one selected feature of the wearable device.

In clause 10, where the present disclosure provides the system of clause 8, wherein the at least one selected feature is one or more of Bluetooth Connect, Bluetooth Disconnect, Touch User Interface (UI), Resume Playback, Pause Playback, Increase Playback Volume, Decrease Playback Volume, Transparency Mode, and Active Noise Cancellation.

In clause 11, where the present disclosure provides the system of clause 1, wherein if the detected use state is an inactive use state, the processor generates a signal to disable at least one selected feature of the wearable device.

In clause 12, where the present disclosure provides the system of claim 1, wherein the processor and memory are remote from the wearable device.

In clause 13, where the present disclosure provides the system of claim 11, wherein the processor and memory are comprised in a user device communicatively coupled to the wearable device.

In clause 14, the present disclosure provides a method for configuring one or more features of a wearable device based on a detected use state of the wearable device, the method comprising: detecting, from one of a plurality of sensors coupled to the wearable device, at least one change in force acting on the wearable device; detecting, from another of a plurality of sensors coupled to the wearable device, at least one change in inertia related to the wearable device; processing, via a processor, the detected at least one change in force and the detected at least one change in inertia; determining, based on the processing, whether a detected use state is active or inactive, and: generating a signal to power on the wearable device if the detected use state is active; and generating a signal to power down the wearable device if the detected use state is inactive.

In clause 15, the present disclosure provides the method of clause 14, wherein the wearable device is a set of headphones.

In clause 16, the present disclosure provides the method of clause 14, wherein the wearable device is an in-ear earphone.

In clause 17, the present disclosure provides the method of clause 15, wherein the headphones comprise a headband that is extendable and retractable, and wherein extension or retraction of the headband results in a change in force that can be detected by at least one sensor in the plurality of sensors.

In clause 18, the present disclosure provides the method of clause 14, wherein if the detected use state is an active use state, the processor generates a signal to enable at least one selected feature of the wearable device.

In clause 19, the present disclosure provides the method of clause 18, wherein the at least one selected feature is one or more of Bluetooth Connect, Bluetooth Disconnect, Touch User Interface (UI), Resume Playback, Pause Playback, Increase Playback Volume, Decrease Playback Volume, Transparency Mode, and Active Noise Cancellation.

In clause 20, the present disclosure provides the method of clause 14, wherein if the detected use state is an inactive use state, the processor generates a signal to disable at least one selected feature of the wearable device.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system comprising:
a wearable device comprising:
a first housing;
a first earphone unit located within the first housing; and
a plurality of sensors, wherein a first sensor of the plurality of sensors is a force sensor, a second sensor of the plurality of sensors is a proximity sensor, and a third sensor of the plurality of sensors is an inertial measurement unit (IMU) sensor; and
at least one processor and memory configured to;
process data from the plurality of sensors;
in response to processing force data from the force sensor, trigger the proximity sensor and the IMU sensor to awaken; and
(i) detect an active use state of the wearable device in response to the force data satisfying a threshold and data of the proximity sensor indicating the wearable device is in proximity to a head or ears of a user; and
generate a signal to power on the wearable device in response to detecting the active use state of the wearable device; or
(ii) detect an inactive use state in response to at least one of: the force data failing to satisfy the threshold, the proximity sensor data indicating the wearable device is not in proximity to the head or ears of the user, or data of the IMU sensor detecting no motion for a threshold duration; and
generate a signal to power down the wearable device in response to detecting the inactive use state of the wearable device.

2. The system of claim 1, wherein the active use state indicates that the user desires operation of the wearable device, and wherein the inactive use state indicates that the user does not desire operation of the wearable device.

3. The system of claim 1, wherein the wearable device is a set of headphones further comprising a headband having a first end coupled to the first housing and having a second end.

4. The system of claim 3, wherein the headband is extendable and retractable, and wherein extension or retraction of the headband results in a change in force detected by the force sensor.

5. The system of claim 4, wherein as the force sensor detects the change in force due to extension of the headband, a load value output by the force sensor increases.

6. The system of claim 3, further comprising:
a second housing coupled to the second end of the headband; and
a second earphone unit located within the second housing.

7. The system of claim 1, wherein the wearable device is an in-ear earphone.

8. The system of claim 1, wherein the plurality of sensors further comprises at least a fourth sensor, and wherein the at least the fourth sensor of the plurality of sensors comprises at least one of; a skin detection sensor, a millimeter (MM) wave sensor, an infrared (IR) sensor, a temperature sensor, a capacitive sensor, or a humidity sensor.

9. The system of claim 1, wherein the at least one processor and memory are further configured to, in response to detecting the active use state of the wearable device, generate a signal to enable at least one selected feature of the wearable device.

10. The system of claim 9, wherein the at least one selected feature is at least one of: Bluetooth Connect, Bluetooth Disconnect, Touch User Interface (UI), Resume Playback, Pause Playback, Increase Playback Volume, Decrease Playback Volume, Transparency Mode, or Active Noise Cancellation.

11. The system of claim 1, wherein the at least one processor and memory are further configured to, in response to detecting the inactive use state of the wearable device, generate a signal to disable at least one selected feature of the wearable device, and wherein the at least one selected feature is at least one of: Bluetooth Connect, Bluetooth Disconnect, Touch User Interface (UI), Resume Playback, Pause Playback, Increase Playback Volume, Decrease Playback Volume, Transparency Mode, or Active Noise Cancellation.

12. The system of claim 1, wherein the processor and memory are comprised in the wearable device.

13. The system of claim 1, wherein the processor and memory are comprised in a user device communicatively coupled to the wearable device.

14. A method for configuring one or more features of a wearable device based on a detected use state of the wearable device, the method comprising:
detecting, from a force sensor of a plurality of sensors coupled to the wearable device, at least one change in force acting on the wearable device;
in response to detecting the at least one change in force acting on the wearable device, triggering a proximity sensor and an inertial measurement unit (IMU) sensor of the plurality of sensors to awaken;
detecting, from the proximity sensor of the plurality of sensors, a proximity of the wearable device to a head or ears of a user;
detecting, from the IMU sensor of the plurality of sensors, at least one change in inertia of the wearable device;

processing, via a processor, the detected at least one change in force, the detected proximity of the wearable device to the head or ears of the user, and the detected at least one change in inertia of the wearable device; and (i) determining, based on the processing, an active use state of the wearable device in response to the at least one change in force satisfying a threshold and the wearable device being within proximity to the head or ears of a user; and generating a signal to power on the wearable device in response to detecting the active use state of the wearable device; or (ii) determining, based on the processing, an inactive use state in response to at least one of: the at least one change in force failing to satisfy the threshold, the wearable device not being within proximity to the head or ears of the user, or detecting no change in inertia for a threshold duration; and generating a signal to power down the wearable device if the detected use state is in response to detecting the inactive use state of the wearable device.

15. The method of claim 14, wherein the wearable device is a set of headphones.

16. The method of claim 15, wherein the set of headphones comprise a headband that is extendable and retractable, and wherein extension or retraction of the headband results in the change in force detected by the force sensor of the plurality of sensors.

17. The method of claim 14, wherein the wearable device is an in-ear earphone.

18. The method of claim 14, further comprising generating, in response to detecting the active use state of the wearable device, a signal to enable at least one selected feature of the wearable device.

19. The method of claim 18, wherein the at least one selected feature is at least one of: Bluetooth Connect, Bluetooth Disconnect, Touch User Interface (UI), Resume Playback, Pause Playback, Increase Playback Volume, Decrease Playback Volume, Transparency Mode, or Active Noise Cancellation.

20. The method of claim 14, further comprising generating, in response detecting the inactive use state of the wearable device, a signal to disable at least one selected feature of the wearable device, wherein the at least one selected feature is at least one of: Bluetooth Connect, Bluetooth Disconnect, Touch User Interface (UI), Resume Playback, Pause Playback, Increase Playback Volume, Decrease Playback Volume, Transparency Mode, or Active Noise Cancellation.

\* \* \* \* \*